United States Patent [19]

Leatherman et al.

[11] Patent Number: 4,918,754
[45] Date of Patent: Apr. 24, 1990

[54] FLOCKED GLOVE AND PLASTIC SLEEVE MEMBER BONDED THERETO

[75] Inventors: Alfred F. Leatherman; Clyde P. Repik, both of Columbus, Ohio

[73] Assignee: William C. Heller, Jr., Milwaukee, Wis.

[21] Appl. No.: 190,150

[22] Filed: May 4, 1988

[51] Int. Cl.⁵ ............................................ A41D 13/08
[52] U.S. Cl. ............................................ 2/16; 2/167; 2/169; 156/272.4; 219/10.53
[58] Field of Search .................. 2/167, 169, 168, 159, 2/162, 16, 2.1 R, 2.1 A, 4; 156/272.4, 272.2, 275.3; 219/10.53

[56] References Cited

U.S. PATENT DOCUMENTS

| | | | |
|---|---|---|---|
| 3,461,014 | 8/1969 | James | 219/10.53 X |
| 4,503,565 | 3/1985 | Lippitt, Jr. et al. | 2/2.1 R |
| 4,693,775 | 9/1987 | Harrison et al. | 156/272.4 |

*Primary Examiner*—Peter Nerbun
*Attorney, Agent, or Firm*—Andrus, Sceales, Starke & Sawall

[57] ABSTRACT

A preformed flock lined rubber-like glove has its cuff folded back to expose the flocked lining and is mounted in a rotating support. A spray nozzle deposits a band of the hot-melt adhesive on the flocked lining of the exposed and rotating cuff. The hot-melt adhesive is a combination of a hot-melt adhesive resin and a uniform dispersion of small particles which create heat in the presence of a high frequency magnetic field. The hot-melt adhesive is allowed to solidify to a solid mass. The glove is telescoped downwardly onto a polyethylene sleeve supported on a rigid form and the cuff is unfolded to place the adhesive into engagement with the sleeve. A high frequency unit includes a high frequency coil having a pair of conducting bars at least one of which is movable. The glove and sleeve subassembly is clamped between the conducting bars and the coil is energized from a high frequency source. The fine particles are activated to heat the hot-melt band simultaneously with application of pressure. The hot-melt adhesive forms a hermetic adhesive bond between the flocked glove and the polyethylene sleeve.

8 Claims, 1 Drawing Sheet

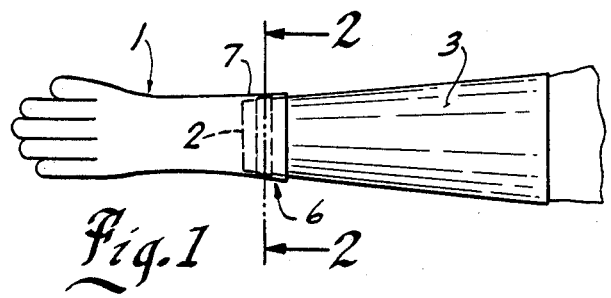
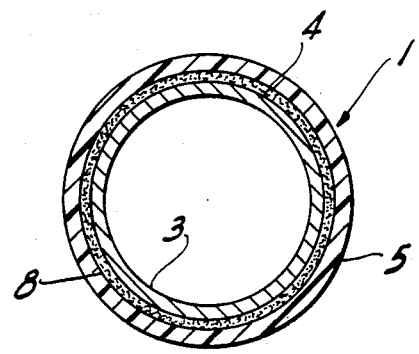
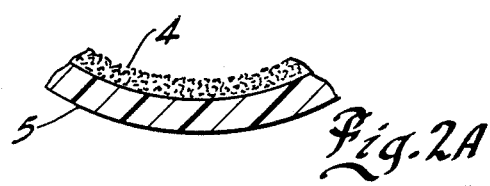
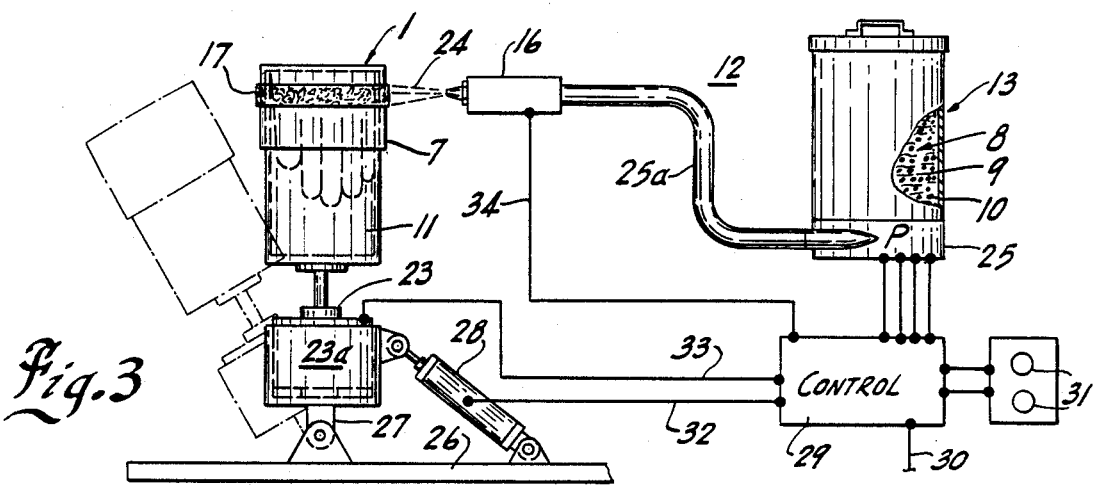
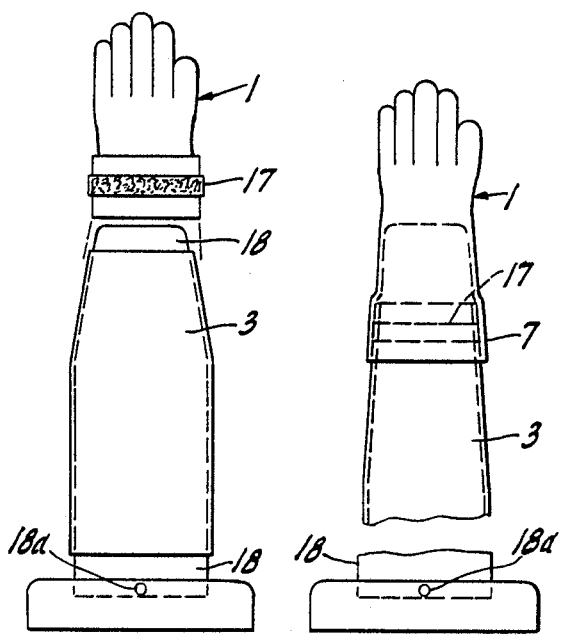
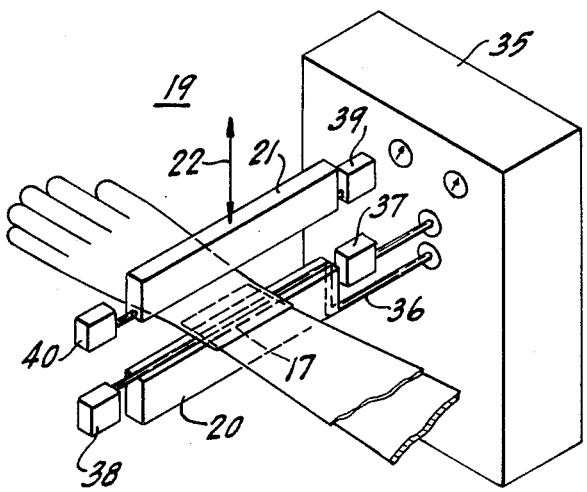

FLOCKED GLOVE AND PLASTIC SLEEVE MEMBER BONDED THERETO

BACKGROUND OF THE PRESENT INVENTION

This invention relates to thermal hot-melt adhesive bonding of elements of dissimilar materials, and particularly bonding of a fabric lined member to a plastic member.

Plastic members are conveniently bonded to each other with a fusion bond between the plastic members. The plastic members are mounted in appropriate superimposed relation. Heat and pressure are then applied over a bond line or area to simultaneously convert the plastic members to a molten or semi-liquid state which, upon cooling, forms a highly effective reliable fusion bond. The junction may be stronger than either of the substrates. Various systems have been used for heating the plastic members. A particularly satisfactory method has been developed and is disclosed in various patents of the present inventors and patents assigned to the assignee of the present invention. For example, U.S. Pat. No. 3,461,014 which issued Aug. 12, 1969 to Wm. C. Heller, Jr. et al and discloses a fusion bonding process based on the unique development. The method generally includes the introduction of gamma ferric oxide particles into the plastic substrate or in a compatible plastic bonding agent interposed between the plastic members at the fusion bond area. A high frequency magnetic field is applied through the bond area, with pressure applied. The high frequency field creates heat in the particles through hysteresic phenomena, with a rapid heating of the plastic members producing a fusion bond. With plastic-to-plastic surfaces, an effective hermetic fusion bond between the members is readily created. Other developers have suggested using larger metal particles in which eddy currents are created in the presence of an appropriate magnetic field to heat the plastic. Other systems merely provide heated bar members which are applied directly to the bond area to effect the fusion bonding.

In certain applications, a fabric lined rubber-like member is to be bonded with a fluid tight connection to another plastic member. A typical application includes bonding of an impervious glove or other similar hand covering to a sleeve member to provide a continuous protective covering over the hand and arm of a user. Suits employing such a continuous hand and arm structure are used in various hazardous environmental conditions. A reliable hermetic connection is therefore essential to maintain the protective enclosure from the surrounding environment. In addition, the glove portion is preferably provided with a fabric lining to provide a more comfortable glove.

Typically, the fabric lined member includes an outer shell of an impervious material such as a rubberized material, latex, plastisol or the like having a fabric lining such as a flocking material. The glove is connected to a plastic sleeve typically of a polyethylene film or similar flexible, impervious plastic. The typical glove with the flocking material and the sleeve material are vastly different materials which are difficult to bond by use of fusion bonding. Further, the melting of the adherend's base materials may require special processing to insure that the continuity of the connection is maintained.

Many other applications exist in which a glove and extended sleeve may advantageously be used such as in handling caustic materials and the like where protection not only of the hands but the arm of the user is essential or desirable.

An alternative to fusion bonding of elements including plastic elements, involves use of a separate adhesive which is applied in liquid or paste form, and forms a joining layer between the elements. Certain hot melt adhesives are available which can be deposited in melted form between the surfaces to be bonded.

Generally, such separate adhesives have not been used for fluid tight connection, because of the superior connection provided by fused materials. The difficulty associated with all bonding is further increased in the bonding of fabric lined material, such as a lined protective plastic glove, and simple application of a hot-melt adhesive has not produced a hermetic connection or a desirable high strength junction.

There is a need however for a simple and effective method of bonding elements of vastly different materials without melting of the elements and particularly a fabric lined rubber-like member, such as a glove or the like, to a plastic surface such as a garment sleeve.

SUMMARY OF THE PRESENT INVENTION

The present invention is particularly directed to a method of adhesive bonding a fabric-lined rubber-like member to another plastic member, and particularly a polyethylene member, using a hot-melt adhesive. Although generally applicable to such bonding, the invention is described in connection with a typical fabric lined glove for reference purposes. Generally, in accordance with the teaching of the present invention, a hot-melt adhesive is formed which is a combination of a hot-melt adhesive resin and small particles which create heat in the presence of a high frequency magnetic field. The lined glove is povided with a layer of the hot-melt adhesive deposited in a liquid or molten form. The adhesive layer is allowed to be thoroughly absorbed by the fabric lined member and allowed to completely solidify. The glove is then assembled with the plastic member, such as by being telescoped over a form containing the sleeve or other plastic member to form a sub-assembly. The solidified adhesive is accurately located between the glove and the plastic member. The sub-assembly including the form is then placed in a high frequency heating unit which includes a high frequency coil unit aligned with the solid adhesive layer. The coil unit includes means to activate the particles and thereby melt the solid hot-melt layer and simultaneously create an appropriate pressurized force across the bond area of the sub-assembly. The heated hot-melt adhesive layer converts to the molten state, and forms an adhesive bond to the glove and to the plastic member, with the fabric interstices completely filled, to form a reliable and essentially hermetic joint.

In a preferred process embodiment, a preformed flock lined rubber-like glove has its cuff portion folded back to expose the lining and the bond area. The glove is held in a suitable fixture with respect to a hot-melt applicator such as a spray nozzle which then deposits a band of the hot-melt adhesive on the exposed cuff area. The hot-melt adhesive is composed of the plastic resin and a uniform dispersion of sub-micron particles which create heat as a result of hysteresis in the presence of the radio frequency magnetic field. The glove is allowed to set until the hot-melt adhesive solidifies to a solid mass. A plastic sleeve member is placed on a flat tapered sleeve form with the bond area adjacent the upper end.

The glove is telescoped downwardly onto the form and the cuff unfolded into engagement with the sleeve and form to produce a subassembly.

A high frequency unit includes a high frequency coil having a pair of conducting bars at least one of which is movable for opening and insertion of the sub-assembly including the glove and sleeve. The conducting bars are then closed to form a continous current path through the coil which is energized from a high frequency source. The fine particles are activated to heat the hot-melt area simultaneously with the application of pressure. As the result, the hot-melt adhesive forms the essential hermetic adhesive bond between the fabric lined member and the plastic sleeve.

The present invention provides a simple but effective bonding of fabric-lined rubber-like impervious members to a plastic surface and particularly a lined glove to a plastic sleeve or the like.

BRIEF DESCRIPTION OF THE DRAWING

The drawing furnished herewith generally illustrates the best mode presently contemplated for carrying out the invention and is described hereinafter.

In the drawing:

FIG. 1 is a plan view of a flock lined plastic glove secured to a sleeve;

FIG. 2 is an enlarged vertical section taken generally on line 2—2 of FIG. 1;

FIG. 2a is an enlarged fragmentary sectional view of the glove;

FIG. 3 is a view of the glove shown in FIGS. 1 and 2 in an application unit for applying a hot-melt adhesive layer;

FIG. 4 is an exploded view illustrating a fixture and assembly of the glove and the sleeve to form a glove/sleeve subassembly;

FIG. 5 is a view similar to FIG. 4 illustrating the glove/sleeve subassembly; and FIG. 6 is a simplified view illustrating the glove/sleeve sub-assembly in a high frequency inductive heating source.

DESCRIPTION OF ILLUSTRATED EMBODIMENTS

Referring to the drawing and particularly to FIG. 1, a glove 1 is shown secured to the cuff end 2 of a garment sleeve 3. The glove 1 has an internal fleece or flock fabric lining 4 which is bonded to an outer plastic or rubber-like shell 5, such as found in various commercially available lined gloves used for various domestic, institutional and commercial work. Generally, the lining 4 is formed of a suitable cotton, wool or other synthetic materials. The lining 4 is suitably bonded to the outer shell 5, which is formed of suitable impervious material such as a rubberized fabric latex, plastisol, a suitable plastic or the like. The lining 4 provides a comfortable surface next to the hand of the user. In the illustrated embodiment, the fabric lined glove 1 is permanently affixed to the sleeve 3 along a circumferential junction or bond area 6 and, in accordance with the teaching of the present invention, includes an essentially hermetic connection. The sleeve 3 is formed of suitable plastic such as polyethylene. The glove 1 is formed with a cuff portion 7 which is adapted to project outwardly over the wrist portion of the hand. The cuff portion 7 telescopes in close spaced relation over the corresponding cuff or wrist portion 2 of the sleeve 3.

In accordance with the present invention, a special bonding adhesive 8, as more clearly shown in FIGS. 2 and 3, joins the fabric lined inner surface of the cuff portion 7 to the outer plastic surface of the sleeve 3. The bonding adhesive 8 permeates the fabric lining 4 and effects a firm interengagement to the plastic shell 5 and plastic sleeve 3, and thereby establishes the desired hermetic connection.

In accordance with the teaching of this invention, the connection between the glove 1 and the sleeve 3 is specially formed using the hot-melt adhesive 8, as presently described and shown in FIGS. 3-5, inclusive.

The adhesive 8 in particular is a mixture of a suitable plastic resin 9 and dispersed small particles 10. The adhesive resin 9 is mixed with the fine particles 10 which respond to a high frequency magnetic field to create heat. The heat is readily formed in a very rapid manner to melt the adhesive resin as hereinafter described. The small particles 10 used by the inventors in the preferred construction are particularly adapted to application in the environments such as that present herein wherein the adhesive is preferably pumped from a supply through a suitable automated applicator for depositing of the hot-melted adhesive layer onto the flocked plastic surface.

The heat generating particles 10 are preferably particles disclosed in the previously identified prior art patents of the inventors, and preferably are a gamma-ferric oxide powder which is thoroughly mixed with the hot-melt adhesive resin 9. Such oxide powder can be readily provided in sub-micron sizes which maintain the necessary physical dispersion within the adhesive resin. The dispersed particles establish minimal surface engagement with the pump apparatus and lines which may be used in applying the adhesive. The oxide powder provides a highly uniform heat pattern throughout the bond area and significantly permits the highly desirable penetration of the fabric material of the lining. Larger sized particles, such as used in eddy current heating and the like, which are generally in the larger sizes and typically 150 microns and larger can create localized heat centers. Such hot spots in the adhesive could melt and create pinholes in the outer plastic shell. Such pinholes would be unacceptable as practically defeating the desired results of an effective hermetic covering including the connection between the glove and sleeve. Further, the larger particles could significantly reduce the saturation of the liner with the particle-laden adhesive and adversely affect the character of the final adhesive bond.

Generally, the present invention uses particle sizes in the range of sub-micron to a maximum 75 microns, and preferably in the sub-micron size. A preferred loading would use a particle loading in a range of 20 percent to 30 percent by weight of the final adhesive mixture. Such percentages should allow the necessary penetration in the fabric while providing a necessary high speed processing. Depending upon the particular requirements and the equipment used however, the particle loading may be as low as 2 percent by weight and as high as 50 percent by weight of the final adhesive mixture.

The particle-laden hot-melt adhesive can of course be formed in any desired form. Thus, hot-melt adhesive resins are readily available in various solid forms such as pellets, slats or pillows. The hot-melt adhesive resin would be melted and compounded with the selected heat generating particles into a hot-melt adhesive mixture. Such hot-melt adhesive could of course be formed as a solidified mass with a suitable hot-melt adhesive applicator used to simultaneously, or sequentially, melt and apply the particle-laden hot-melt adhesive to the glove.

Referring particularly to FIG. 3, an apparatus for applying adhesive to glove 1 is shown. The preformed lined glove 1 is arranged with the cuff portion 7 folded backwardly onto the glove to expose the lined bond area 6. The folded glove 1 is supported in a suitable rotating fixture or support 11 adjacent a hot-melt adhesive applicator 12. The fixture 11 is shown as a tubular member, with the glove 1 projecting into the fixture and with the cuff portion folded back over the exterior of the fixture. The applicator 12 is coupled to a source 13 of the particle-laden adhesive 8 and includes a nozzle 16 or other applicating device for depositing a hot-melt adhesive layer 17 onto the exposed lined cuff portion 7. The fixture is shown rotating relative to a fixed nozzle 16 to apply a continuous band of the molten adhesive onto the cuff. The characteristic of the particle-laden adhesive is such that it maintains its positioning on the glove as an adhesive layer 17. The adhesive mixture has sufficient viscosity to completely saturate and fill the cuff fabric and to maintain a self-supporting hot-melt adhesive layer 17. The adhesive laden glove 1 is allowed to sit for a sufficient period to totally solidify the adhesive layer 17 and thus provide a glove with a solid layer 17 of adhesive on the cuff 7. Although any suitable adhesive may be used where the one member is a polyethylene, the inventors have found that an olefin compatible based hot-melt adhesive produces a particularly satisfactory bond. Such adhesives for example are available from Baychem International of Houston, Texas under the trademark Numel.

Referring to FIGS. 4 and 5, the sleeve member 3 is mounted on a flat tapered support board 18 with the cuff portion 2 adjacent the outer end of the tapered board 18. A glove 1 having the solidified adhesive layer 17 is placed over the end of the sleeve covered tapered board 18, and the glove cuff 7 unfolded downwardly into overlyingengagement with the sleeve cuff portion 2 as shown in FIG. 5. The glove is thereby simply and reliably aligned with the sleeve 3 with the hot-melt adhesive layer 17 abutting the sleeve 3. The board 18 is releasably mounted in a base support such as by a releasable clamp unit 18a. The board 18 with the sleeve and glove thereon forms a sub-assembly which is removed from the base support and inserted into a high frequency inductive heating unit 19 as shown in FIG. 6.

The illustrated high frequency inductive heating unit 19 includes a pair of oppositely aligned conducting bars 20 and 21. The top bar 21 is moveable for opening the bars to receive the sub-assembly and with the hot-melt layer 17 aligned with the bars 20 and 21. The bars 20 and 21 are then closed with a pressure engagement as diagrammatically shown at 22, and are operable to create a high intensity heat in the adhesive layer 17. The bars 20 and 21 create a relatively firm pressure across the interface. The heat of the particles 10 melts the hot-melt adhesive layer which then creates a bond to sleeve 3.

The heating unit 19 is an induction heating unit creating a magnetic field through the bond layer 17. The frequency of the field is typically in the megahertz range, and preferably 1.8 to 7 megahertz but may be any suitable level which creates sufficient activating of the particles. The high frequency magnetic field activates the particles 10, preferably such as more fully disclosed in the inventor's previous patents, to convert the hot-melt adhesive to the molten state and establish the desired joint. The energizing of the particles 10 is terminated, and the adhesive again solidifies to establish a desired hermetic bonding of the glove cuff 2 to the sleeve cuff 7.

The apparatus for applying of the hot-melt adhesive to the glove cuff and the particular heating unit may of course take various forms and constructions. A diagrammatic illustration of a typical apparatus is shown in FIGS. 3–5 of the drawing and more fully described as follows.

More particularly, the illustrated adhesive applicating apparatus 12 is illustrated including the vertically upstanding glove support 11 adapted to receive the hand portion of the glove 1 with the cuff 3 folded backward onto the hand portion. The glove support 11 is secured to a rotating stand 23. A motor 23a is coupled to the stand 23 for rotating of the support 11 and the supported glove 1.

The nozzle unit 16 is generally a commercially available unit and is diagrammatically illustrated. Nozzle unit 16 may be of any suitable constructed adapted to establish a band of adhesive projected outwardly, as at 24, into engagement with the rotating glove 1. Typically, the adhesive source 13 includes a suitable heater, not shown, to maintain the adhesive molten and a pump 25 operates continuously to maintain the adhesive under pressure in an interconnecting hose 25a to the nozzle 16 for application of adhesive onto the glove 1. The nozzle 16 is turned on and off to establish the projected adhesive 24.

For convenient mounting and removal of the glove 1 on the stand 23, the stand 23 is shown pivoted to a base support 26, as at 27. A cylinder unit 28, which may be pneumatically actuated, holds the support 23 between the vertical rotating position, shown in full line and a downwardly tilted or pivoted inclined position, as shown in phantom, for mounting and removal of the folded glove 1. The tilted position spaces the glove and support from nozzle 16 for convenient mounting and removal of the glove 1 from support 11.

An electrical control unit 29 is shown for operating the illustrated system. A typical control unit that can be used is the known microprocessor type of programmable controller available from many manufacturers and adaptable into the present system using routine procedures. Any suitable control can be used, including individual operator control of each component and no further internal description of the control unit is given.

Electrical power to the control unit is supplied by line 30 and power is supplied to the operating component by operator controlled pushbuttons 31. The control sequence is initiated when pushbuttons 31 are actuated. For safety, the two buttons 31 can be located a foot or two apart, as common in industrial practice, and connected via the control unit 29 so that each of the buttons must be pressed at the same time requiring both of the operator's hands to be in the intended place while the mandrel is in motion and the adhesive is being applied. The pump 25 operates continuously to maintain molten adhesive under pressure in the hose 25a to nozzle 16. At the proper time in the programmed sequence of the controller, output 32 operates the air cylinder 28, the control output 33 actuates the motor 23a, and output 34 turns the nozzle 16 on. At the end of the programmed period of applying adhesive 24, the cycle is reversed to locate the stand 11 for convenient removal of the glove, with adhesive layer 17 thereon.

The heating unit 19 is diagrammatically shown including a simple bar-type heating coil unit 20. The bars are illustrated as conductive bar members formed of copper or other suitable high conductivity material. The one bar 20 is held stationary in a generally horizontal position. Bar 20 has one end connected to one side of a suitable high frequency power source 35 as at 36. The opposite side of the source 35 is connected to fixed contact 37. A similar fixed contact 38 is connected to the opposite end of bar 20 and in a common horizontal plane with contact 37. The opposed upper bar 21 is mounted to the top side of the fixed bar 20 for vertical movement. This permits the upper bar 21 to open the bars for insertion and removal of the glove/sleeve sub-assembly. The opposite ends of bar 21 include contacts 39 and 40 complementing contacts 37 and 38. The aligned contacts of the bars 20 and 21 preferably are formed with a releasable connection, not shown, defining a firm and reliable electrical interconnection upon closing of the bars upon the glove/sleeve sub-assembly. The opposed ends of the contacts may be formed with a telescoped pressurized slot and tab connection to establish a close fitting interface at the movable connection and thereby provide a low resistance transfer interface with minimal heating, arcing and other similar adverse electrical effects. Such structures are provided and known in the art and no further description thereof appears necessary.

As noted, the particular apparatus for applying of the bond layer of the hot-melt layer 17 and the heating of the interface may take many other various forms. The essentials required are the application of the particle-laden hot-melt adhesive layer to the fabric-lined glove, the solidification of such special adhesive layer and the subsequent assembly to the sleeve or other plastic member with subsequent heating and remelting of the adhesive layer under appropriate pressure to establish the desired hermetic connection.

In summary, the operation of the illustrated semi-automatic applicator would include the manual loading of the glove 1 to the glove support 11, with the support 11 tilted and spaced from the nozzle 16. The glove is placed over the support 11 and the cuff folded down over the support. The operator actuates the control buttons 31 to pivot the support 11 and glove 1 to the application position and operate the motor 23a and nozzle 16 to apply the adhesive.

Any other suitable control can be used. Thus, a suitable sensor unit, not shown, could detect the vertical position of the support to initiate rotation of the unit and actuate the nozzle 16 to apply the hot-melt adhesive 24. A suitable fixed time period can be established to ensure the application of a circular band of adhesive. Further, for any given glove design and adhesive, the number of revolutions of the glove may be set to develop the proper and desired adhesive thickness.

In a practical application, the adhesive layer 17 may be a quarter of an inch wide. Although the width of the layer is not critical, the layer should be formed with a minimum width of about $\frac{1}{8}$ of an inch to maintain the adhesive hermetic bond under normal ususage of the work. After the complete layer 17 is formed, the support 11 is pivoted to the release position.

The operator manually unloads the folded glove and places it on an appropriate cooling table in the folded position. The adhesive layer 17 is allowed to solidify during which time the operator can reload the applicator mechanism.

During the forming the layer 17, the operator can move the glove 1 with the solidified layer 17 to the sleeve covered board 18. The operator unfolds the cuff downwardly so that the flocked interior glove 1 abuts the outer surface of the plastic sleeve 3. The glove/sleeve and board sub-assembly is then removed by release of the clamp 18a and either stacked with other similar formed devices or placed directly into the heating unit 19, which is actuated to activate particles 10 for forming of the hermetic connection 6. In a practical process, the layer 17 is heated for a few seconds, the power supply is de-energized while the bars 20 and 21 are held closed for a few seconds to provide cooling of the adhesive, and thereafter the bars 20 and 21 are opened to remove the bonded product. The bonded glove and sleeve 3 are removed from board 18.

The resulting lap-joint adhesive bond formed in accordance with the present invention was stronger in use than the base materials. Thus, it was found that the substrate elements 1 and 3 would tear under stretch tests prior to any failure of the bond 6. It would appear that the concept of applying the hot-melt adhesive to the flocked surface with solidification prior to assembly and the subsequent remelting of the solidified hot-melt adhesive by inductive energy resulted in increased flow and penetration throughout the interface of the hot-melt adhesive. The inductive remelting appears to particularly produce a significantly improved adhesive bond to the polyethylene surface of the sleeve.

The particle adhesive may within the broadest aspect of the invention be applied to the polyethylene sleeve and then assembled with the flocked glove for the pressurized inductive heating of the assembly.

Various modes of carrying out the invention are contemplated as being within the scope of the following claims, particulary pointing out and distinctly claiming the subject matter of the invention.

We claim:

1. The method of joining a flocked glove of a rubber-like shell and a flocked lining to a tubular plastic number, said glove having a cuff portion having an inner surface including said flocked lining, comprising mixing a hot-melt adhesive including a hot-melt adhesive resin and sub-micron particles, said particles generating heat in the presence of an RF magnetic field, folding said cuff portion backwardly to expose the inner surface, supporting said glove with the cuff portion folded backwardly to expose the lining, applying a band of said hot-melt adhesive mixture in molten form to create a layer of adhesive on said exposed flocked lining of said cuff portion, solidifying said layer on said glove, placing the cuff portion onto a flat member with the layer abutting the flat member to form a sub-assembly, mounting of said sub-assembly in a high frequency induction unit, applying pressure across said members and energizing of said induction unit to create a high frequency magnetic field across said cuff portion and thereby remelting of said hot-melt adhesive and connecting the glove to said tubular member with an airtight connection.

2. The method of claim 1 wherein said applying a band of said hot-melt adhesive includes rotating of the glove and depositing a pressurized spray of hot-melt adhesive of said rotating glove.

3. The method of claim 2 wherein said depositing is continued for a time period to ensure the application of a circular band of said adhesive.

4. The method of claim 1 including applying said layer with a width of approximately one quarter of inch wide.

5. The method of joining a flocked glove of a rubber-like shell and a fabric lining to a tubular plastic member, comprising forming a hot-melt adhesive including a hot-melt adhesive resin and sub-micron particles of gamma-ferric oxide, supporting said glove with the cuff portion folded backwardly to expose the inner flocked area, applying a band of said hot-melt adhesive mixture in molten form to said exposed flocked glove as about a quarter inch band encircling the glove solidifying said layer on said glove, assembling a sleeve on a form with an exposed cuff end, telescoping of said folded glove onto to said sleeve end and unfolding and stretching of said glove onto said sleeve and form to form a subassembly, removing of the form with said sleeve and glove thereon and mounting of said sub-assembly between a pair of jaws of a high frequency induction unit, closing of said jaws and energizing of said jaws to create a high frequency mgnetic field across said bond area and thereby remelting of said hot-melt adhesive and thereby effecting a firm air-tight joint of the glove to said sleeve.

6. A protective garment unit comprising a flocked glove of a rubber-like shell having a flocked lining, a plastic sleeve member having a cuff portion telescoped into said glove, a hot-melt adhesive band including a hot-melt adhesive resin and sub-micron particles interposed between said cuff portion and said glove, said particles generating heat in the presence of an RF magnetic field, and said adhesive band being intimately adhesively bonded to said rubber-like shell of said glove and said sleeve and forming a hermetic connection of said glove to said sleeve.

7. The garment unit of claim 6 wherein said sleeve is formed of a polyethylene plastic.

8. The garment unit of claim 7 wherein said adhesive resin is an olefin compatible resin.

* * * * *

UNITED STATES PATENT AND TRADEMARK OFFICE
CERTIFICATE OF CORRECTION

PATENT NO. : 4,918,754

DATED : April 24, 1990

INVENTOR(S) : ALFRED E. LEATHERMAN ET AL

It is certified that error appears in the above-identified patent and that said Letters Patent is hereby corrected as shown below:

Claim 2, column 8, line 65, delete "of" and substitute therefor -- on --; Claim 5, column 9, line 12, after "glove" insert -- , --; Claim 5, column 10, line 1, delete "mgnetic" and substitute therefor -- magnetic --.

Signed and Sealed this

Second Day of June, 1992

Attest:

DOUGLAS B. COMER

*Attesting Officer*   *Acting Commissioner of Patents and Trademarks*